US010893646B2

(12) United States Patent
Frew

(10) Patent No.: US 10,893,646 B2
(45) Date of Patent: Jan. 19, 2021

(54) PLANT FRAMING APPARATUS

(71) Applicant: Brenda Marie Frew, Prattville, AL (US)

(72) Inventor: Brenda Marie Frew, Prattville, AL (US)

( * ) Notice: Subject to any disclaimer, the term of this patent is extended or adjusted under 35 U.S.C. 154(b) by 304 days.

(21) Appl. No.: 15/653,272

(22) Filed: Jul. 18, 2017

(65) Prior Publication Data
US 2018/0027752 A1 Feb. 1, 2018

Related U.S. Application Data

(63) Continuation-in-part of application No. 15/224,484, filed on Jul. 29, 2016, now abandoned.

(51) Int. Cl.
*A01G 9/02* (2018.01)
*A01G 7/00* (2006.01)

(52) U.S. Cl.
CPC . *A01G 9/02* (2013.01); *A01G 7/00* (2013.01)

(58) Field of Classification Search
CPC ... A47G 7/04; A47G 7/00; A01G 5/00; A01G 5/02; A01G 5/04; A01G 9/00; A01G 2009/003; A01G 9/02; A01G 9/022; A01G 9/024; A01G 9/025; A01G 9/028
See application file for complete search history.

(56) References Cited

U.S. PATENT DOCUMENTS

| | | | | | |
|---|---|---|---|---|---|
| 2,716,827 A | * | 9/1955 | Mixter | ...................... | A01G 5/04 248/27.8 |
| 2,760,052 A | * | 8/1956 | Owen | ...................... | A01G 5/00 362/123 |
| 4,942,692 A | * | 7/1990 | Colbert | ...................... | A01G 5/04 248/27.8 |
| 5,454,189 A | * | 10/1995 | Graham | ...................... | A01G 5/04 47/41.01 |
| 6,017,132 A | * | 1/2000 | Miller | ...................... | A01G 5/04 362/122 |
| 6,076,940 A | * | 6/2000 | Sanford, Jr. | ............. | A01G 9/02 362/122 |
| 6,260,987 B1 | * | 7/2001 | Wu | ......................... | F21V 21/08 362/124 |

(Continued)

OTHER PUBLICATIONS

Electric Wire (Year: 2015).*

*Primary Examiner* — Thanh Pham
(74) *Attorney, Agent, or Firm* — Dunlap Bennett & Ludwig, PLLC

(57) ABSTRACT

A plant framing apparatus that provides aesthetic appearance and overcome water evaporation issues includes a first frame section, a second frame section, a plurality of locking mechanisms, and a plant opening. The first frame section and the second frame section are attached to each other by the plurality of locking mechanisms so that the first frame section and the second frame section can surround a plant base. The overall profile of the plant opening is formed by an inner lateral wall of the first frame section and the second frame section so that the plant base can project through the plant framing apparatus. Furthermore, the plant framing apparatus can include an interchangeable watering system to overcome drought conditions of the plant and/or an interchangeable lighting system to improve the aesthetic appearance of the plant.

14 Claims, 14 Drawing Sheets

(56) References Cited

U.S. PATENT DOCUMENTS

| | | | | |
|---|---|---|---|---|
| 6,488,391 | B1* | 12/2002 | Gary | B44C 3/12 |
| | | | | 248/150 |
| 6,685,340 | B2* | 2/2004 | Symonds | B44C 5/00 |
| | | | | 362/122 |
| 8,122,642 | B1* | 2/2012 | Huberman | C05F 11/08 |
| | | | | 47/59 S |
| 8,567,119 | B2* | 10/2013 | Kepes | A01G 5/04 |
| | | | | 47/41.01 |
| 2007/0062114 | A1* | 3/2007 | Kruer | A01G 9/02 |
| | | | | 47/65.8 |
| 2010/0141156 | A1* | 6/2010 | Canino | F21V 33/0028 |
| | | | | 315/154 |
| 2011/0101873 | A1* | 5/2011 | Wang | G09F 13/28 |
| | | | | 315/185 R |
| 2012/0205504 | A1* | 8/2012 | Cute | A47G 7/00 |
| | | | | 248/150 |
| 2013/0229823 | A1* | 9/2013 | Sanford, Jr. | A01G 9/02 |
| | | | | 362/554 |

* cited by examiner

PLANT FRAMING APPARATUS

The current application is a continuation-in-part (CIP) application of a U.S. non-provisional application Ser. No. 15/224,484 filed on Jul. 29, 2016.

FIELD OF THE INVENTION

The present invention is generally related to the plant surrounding. More specifically, the present invention is an easily detachable plant framing apparatus that can hold an interchangeable watering system to overcome drought conditions of the plant and/or an interchangeable lighting system to improve the aesthetic appearance of the plant.

BACKGROUND OF THE INVENTION

Gardeners and plant enthusiasts all over the world are always looking for new and exciting ways to maintain and decorate their garden, pots, landscape, and showcase their plants. Generally, garden plants are decorated through hired landscaping companies according to gardeners requites or pre-planned design templates. This process tends to be expensive and permanent as gardeners are normally required to consult and hire the professional landscaping companies. Even though there are some know apparatuses that allow gardeners to frame a plant base during the initial stages, they are extremely difficult to remove as the plant grows overtime. Additionally, existing products also lack the feasibility of integrating additional functionality due to poor component arrangement.

It is therefore an objective of the present invention to provide a plant framing apparatus that is easily detachable and multi-purpose surround frame system adaptable to multiple plants. The present invention is useful to gardeners, landscapers, and florist as the present invention provides indoor and outdoor usage. The present invention consists of two detachable bodies so that the plant base can be easily surrounded. The present invention also allows the usage of different interchangeable application such as a watering system and/or a lighting system thus providing additional functionality to the present invention. As a result, the present invention provides an improved apparatus that can function as a plant framing apparatus while preventing harm to the surrounding plant. Additionally, the watering system and/or the lighting system allow continuous connection ability between multiple plant surround devices to ensures survival of surrounding plants and minimizes expenses. Furthermore, the present invention can be easily installed or removed from the plant base, eliminating permanent installation.

DETAIL DESCRIPTIONS OF THE INVENTION

Figure 1:
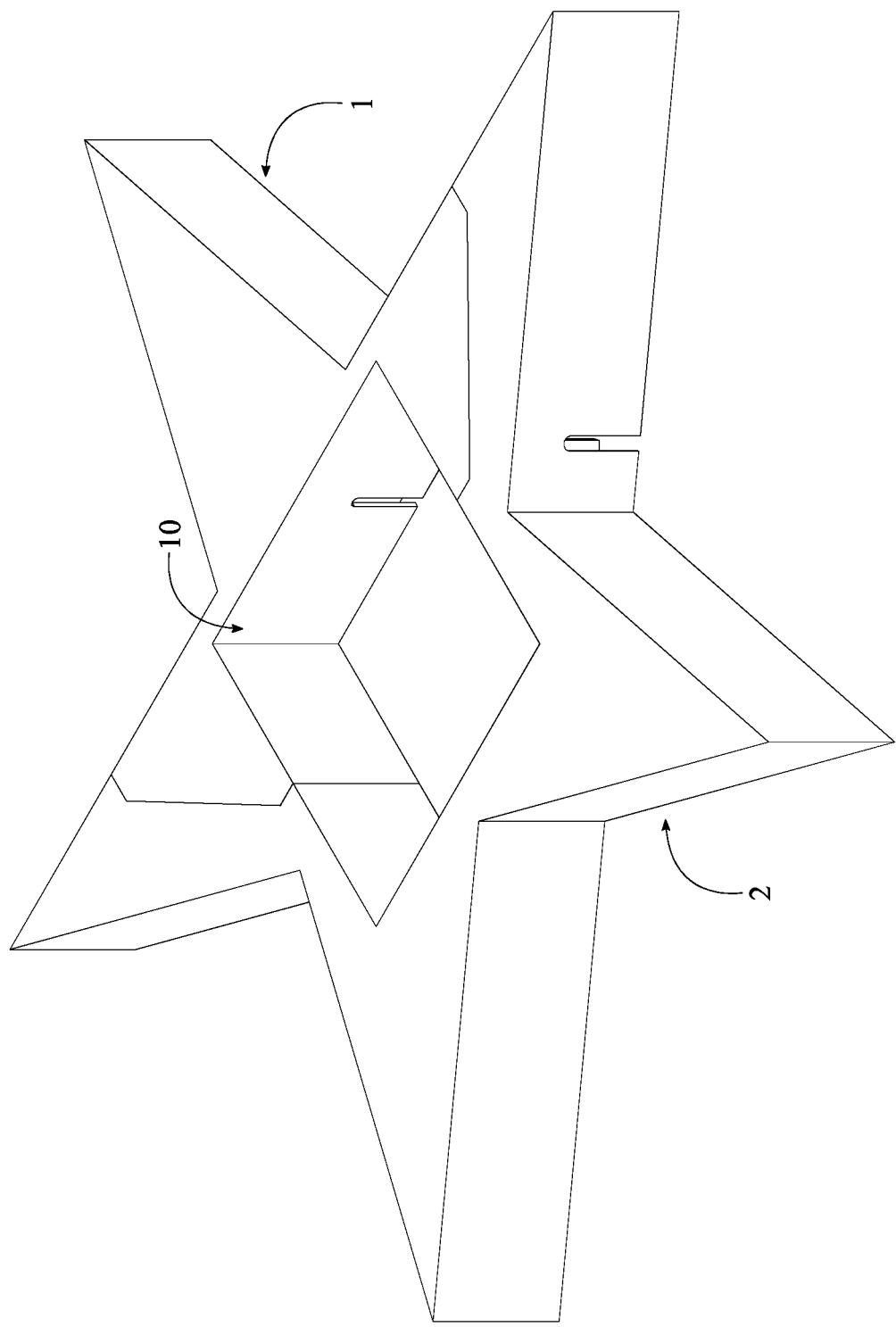
FIG. 1 is a perspective top view of the present invention.
Figure 2:
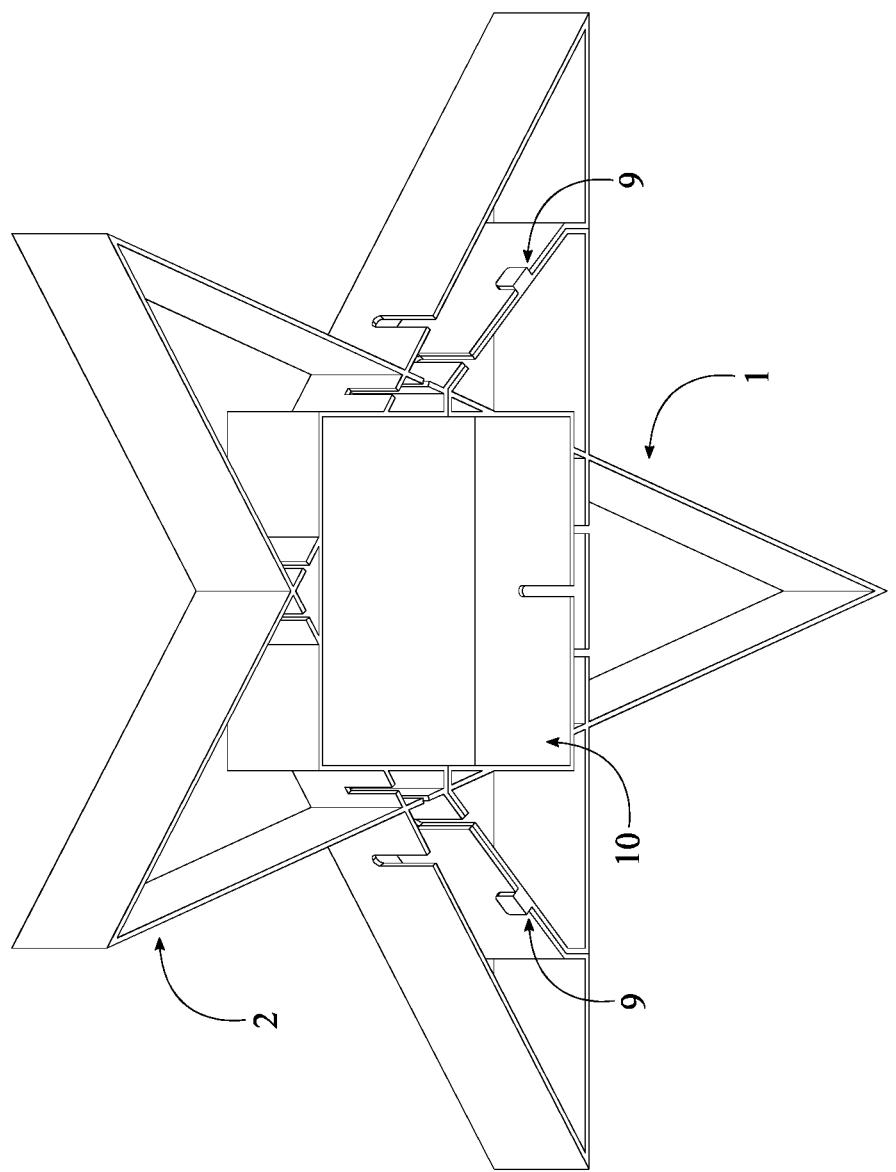
FIG. 2 is a perspective bottom view of the present invention.

All illustrations of the drawings are for the purpose of describing selected versions of the present invention and are not intended to limit the scope of the present invention.

The present invention is a plant framing apparatus and provides a decorative and multipurpose plant surrounding that can be utilized with indoor or outdoor plants. The present invention is completed with two easily detachable surrounding bodies for effortless installation and integrated with a lighting apparatus and/or a watering apparatus to improve the functionality. The present invention comprises a first frame section 1, a second frame section 2, a plurality of locking mechanisms 9, a plant opening 10, and at least one accessory system 13 as shown in FIG. 1-2 and FIG. 12-14. In reference to the general configuration of the present invention, the first frame section 1 and the second frame section 2 are attached to each other by the plurality of locking mechanisms 9 so that an inner lateral wall 6 of the first frame section 1 and the second frame section 2 are able to collectively delineate the plant opening 10. Resultantly, the first frame section 1 and the second frame section 2 surround a plant base as the plant opening 10 allows the plant to be projected through the present invention. The at least one accessory system 13 is internally integrated into the first frame section 1 and the second frame section 2 so that the present invention is able to provide illumination to the plant and/or water to the plant.

The first frame section 1 and the second frame section 2 function as the enclosing bodies for the plant base as they are supposed to surround the plant base. In reference to FIG. 3-5, the first frame section 1 and the second frame section 2 each comprise a cover panel 3, an outer lateral wall 4, a pair of interlocking lateral walls 5, and a plurality of structural walls 11. More specifically, the outer lateral wall 4 and the inner lateral wall 6 are terminally connected to each other by the pair of interlocking lateral walls 5 thus completing a continuous lateral wall. The outer lateral wall 4, the pair of interlocking lateral walls 5, and the inner lateral wall 6 are perpendicularly positioned to the cover panel 3 and perimetrically connected around the cover panel 3. In the preferred embodiment of the first frame section 1 and the second frame section 2 jointly shaped into a concave decagon that is also known as a star-shaped. Even though the preferred embodiment is formed into the concave decagon, the present invention can be formed into any geometric or organic shapes. For example, in an alternative embodiment of the present invention, the overall shape of the first frame section 1 and the second frame section 2 can be rectangular or round.

Figure 3:
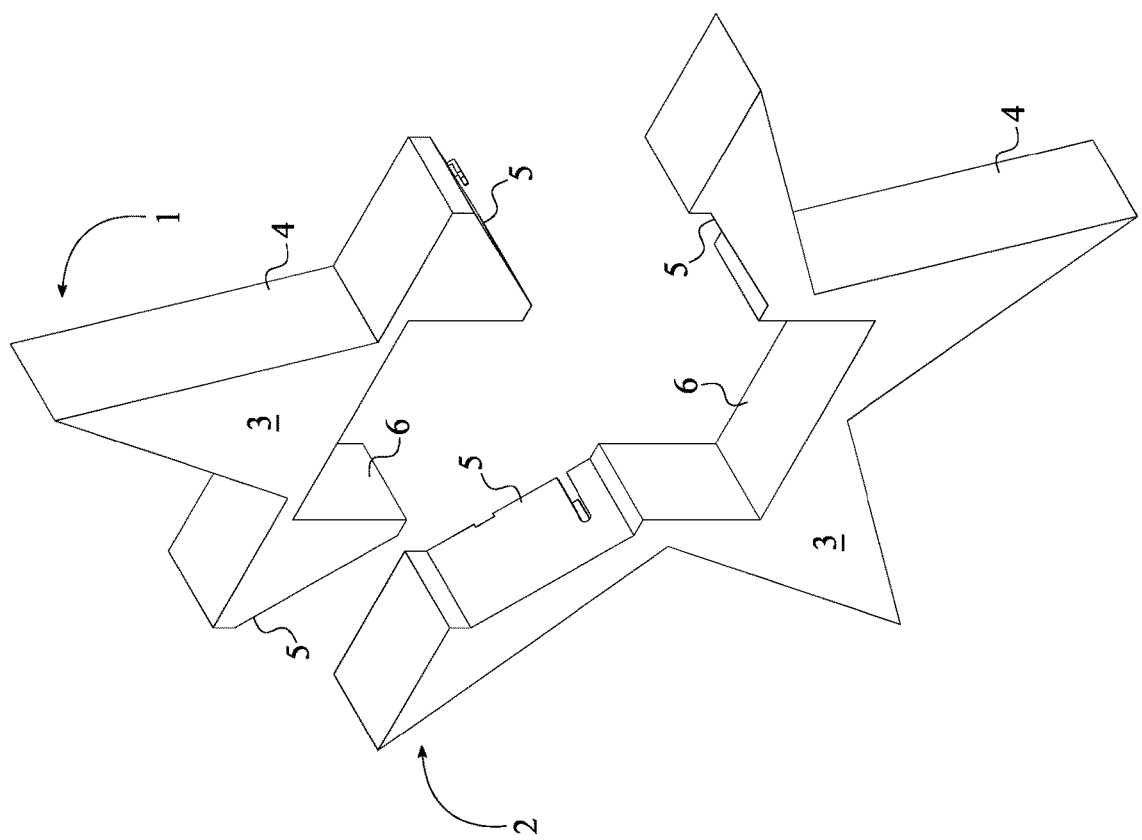
FIG. 3 is a front exploded view of the first frame section and the second frame section of the present invention.
Figure 4:
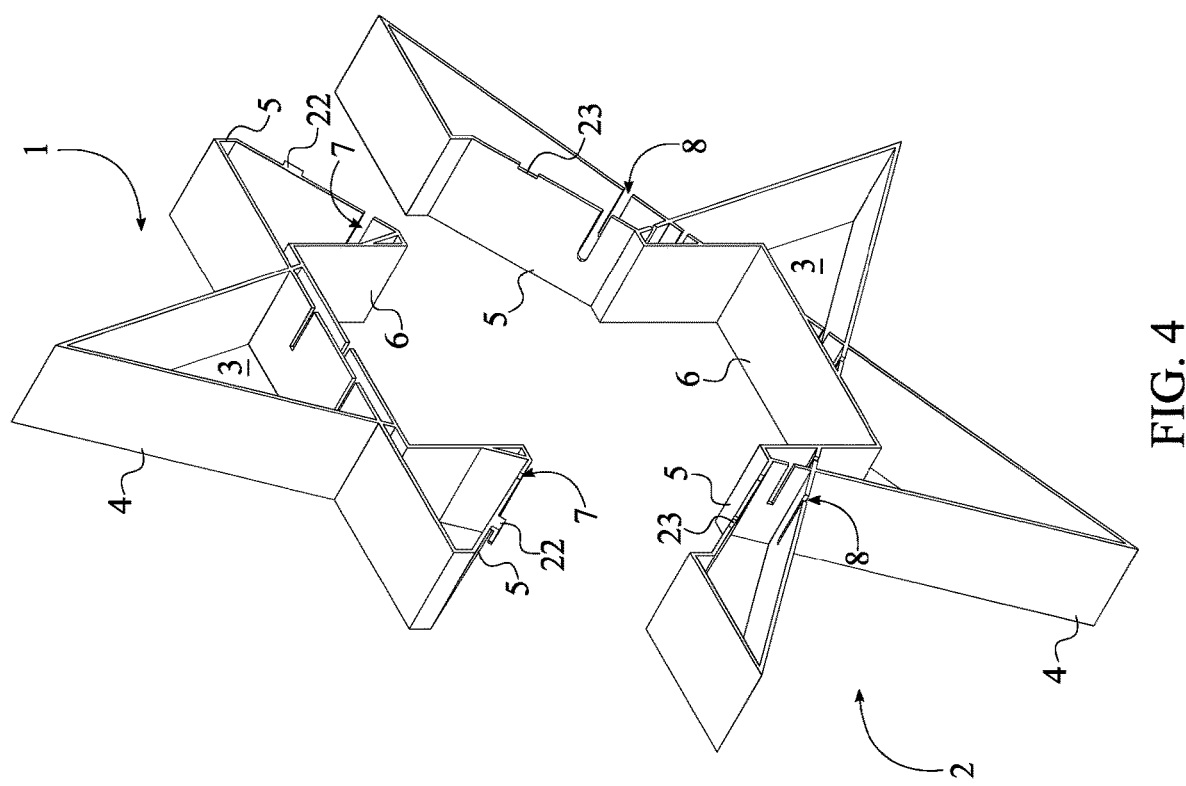
FIG. 4 is a rear exploded view of the first frame section and the second frame section of the present invention.
Figure 8:
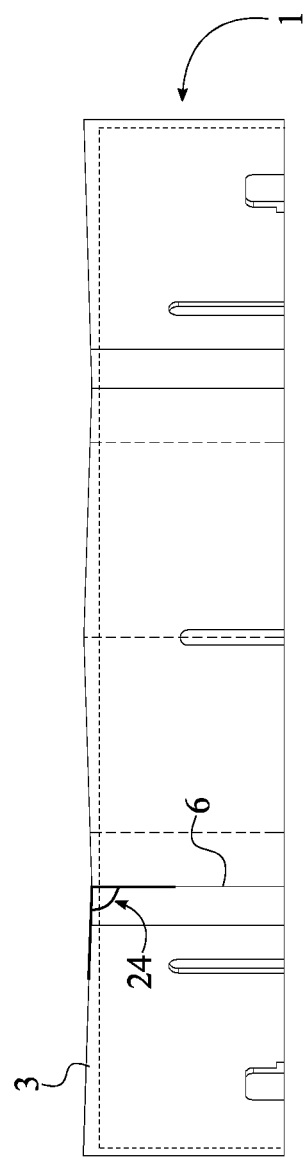
FIG. 8 is a side view of the first frame section of the present invention, showing the obtuse angle between the inner lateral wall and the cover panel.
Figure 11:
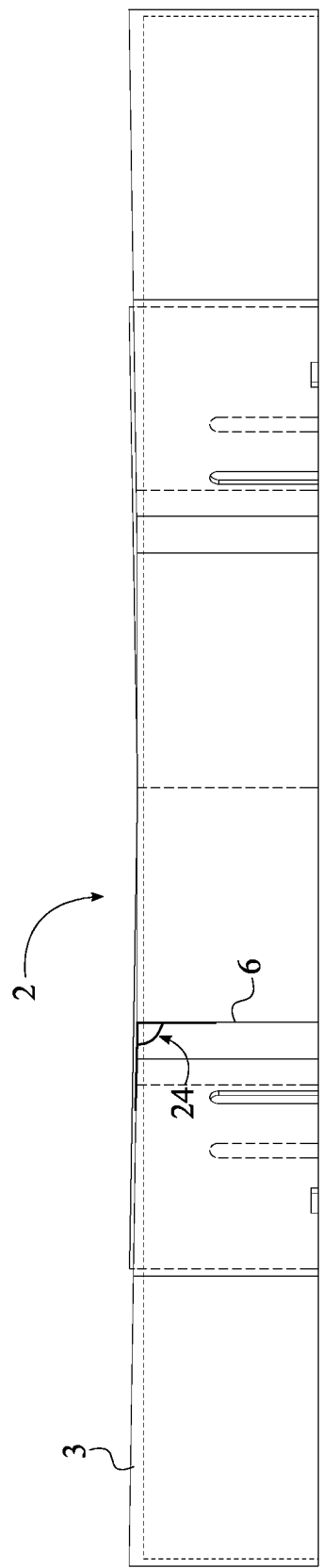
FIG. 11 is a side view of the second frame section of the present invention, showing the obtuse angle between the inner lateral wall and the cover panel.

In reference to FIG. 3-4, the cover panel 3 is perimetrically connected to the outer lateral wall 4, the pair of interlocking lateral walls 5, and the inner lateral wall 6. The cover panel 3 can be formed into a smooth top panel, a textured top panel, a grooved top panel, and a translucent top panel, where one does not precede the other. Additionally, the cover panel 3 for the first frame section 1 and the second frame section 2 are angularly extended from the outer lateral wall 4 of the first frame section 1 and the second frame section 2 to the plant opening 10 as shown in FIG. 8 and FIG. 11. More specifically, the cover panel 3 for the first frame section 1 and the inner lateral wall 6 of the first frame section 1 are angularly positioned with each other at an obtuse angle 24. The cover panel 3 for the second frame section 2 and the inner lateral wall 6 of the second frame section 2 are angularly positioned with each other at the obtuse angle 24. As a result, the cover panel 3 is slopped inward and downward from an outer edge of the cover panel 3 to the plant opening 10 of the present invention thus directing collected water to the root system of the plant base. Due to the positioning of the cover panel 3, the present invention is able to prevent water evaporation around the plant base.

Figure 5:
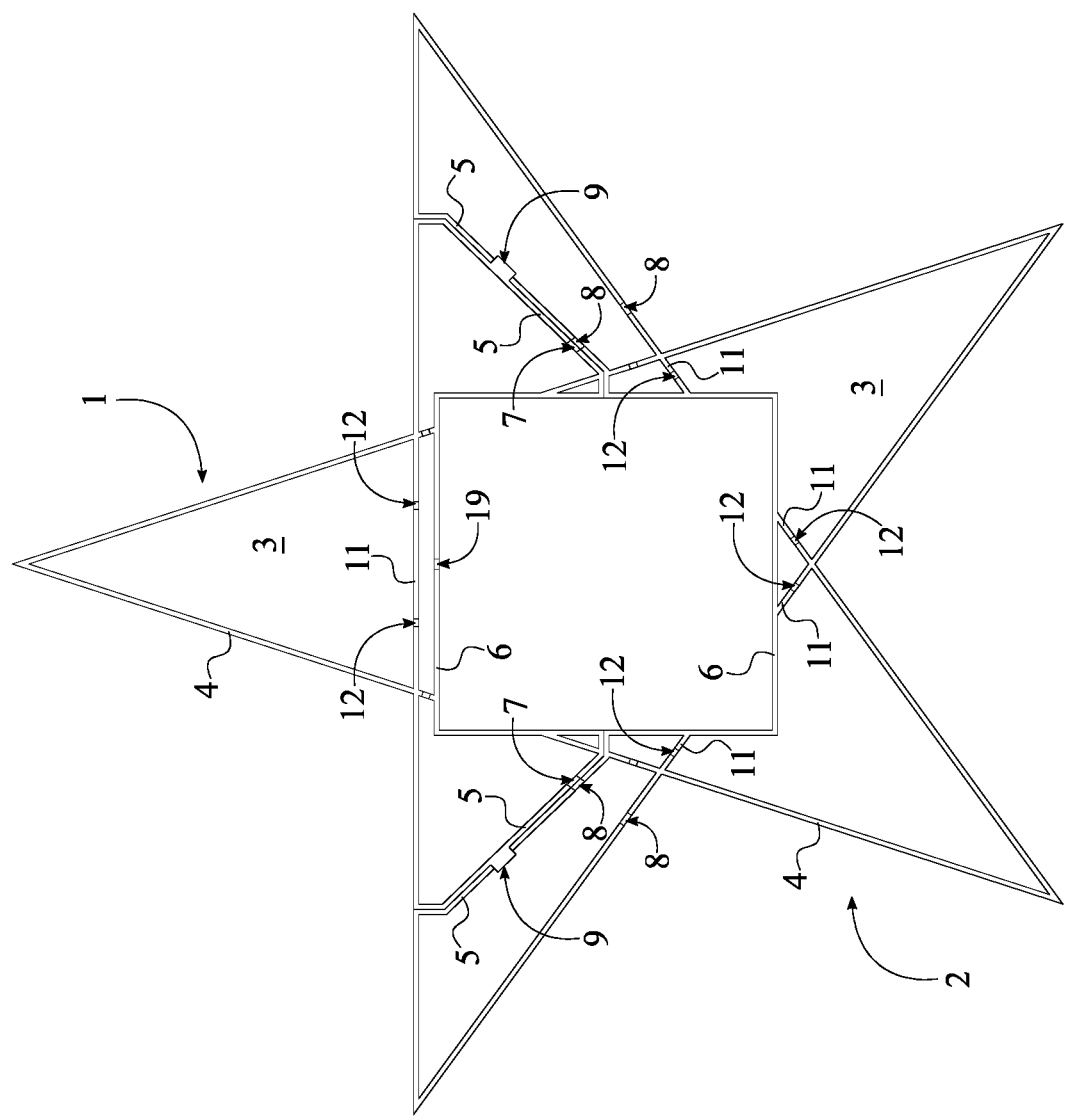
FIG. 5 is a rear view of the present invention.

In reference to FIG. 5, the plurality of structural walls 11 is internally connected to the outer lateral wall 4, the pair of interlocking lateral walls 5, the cover panel 3, and the inner lateral wall 6 of the first frame section 1 and the second frame section 2. The plurality of structural walls 11 improves the structural integrity of the first frame section 1 and the second frame section 2 thus eliminating any deformation over time. Additionally, the plurality of structural walls 11 functions as base attachment members for the at least one accessory system 13 that is integrated into the present invention. In order to properly place and secure the at least one accessory system 13 within the present invention, at least one channel opening 12 is traversed through each of the plurality of structural walls 11 as the at least one channel opening 12 is positioned within the outer lateral wall 4, the pair of interlocking lateral walls 5, the cover panel 3, and the inner lateral wall 6.

The present invention preferably comprises snap-fit fasteners as the plurality of locking mechanisms 9. More specifically, each of the plurality of locking mechanisms 9 comprises a first interlocking body 22 and a second interlocking body 23 that are pressed together to attached the first frame section 1 and the second frame section 2. In reference to FIG. 5-7, the first interlocking body 22 for the plurality of locking mechanisms 9 is a L-shaped arm. The first interlocking body 22 is connected to the first frame section 1 and positioned adjacent to an interlocking lateral wall for the pair of interlocking lateral walls 5 of the first frame section 1. Resultantly, the first interlocking body 22 is positioned offset from the first frame section 1. The second interlocking body 23 for the plurality of locking mechanisms 9 is a cavity and integrated to an interlocking lateral wall for the pair of interlocking lateral walls 5 of the second frame section 2. The second interlocking body 23 is traversed into the pair of interlocking lateral walls 5 of the second frame section 2. As a result, when the first frame section 1 and the second frame section 2 are attached to each other by the plurality of locking mechanisms 9, the first interlocking body 22 and the second interlocking body 23 are engaged with each other about the pair of interlocking lateral walls 5 of the first frame section 1 and the second frame section 2 thus completing the overall profile of the present invention. Even though the present invention preferably utilizes the snap-fit fasteners as the plurality of locking mechanisms 9, the present invention is not limited to the snap-fit fasteners and can utilize any other types of fasteners such as male and female fasteners, friction-fir fasteners, and magnetic fasteners.

Figure 6:
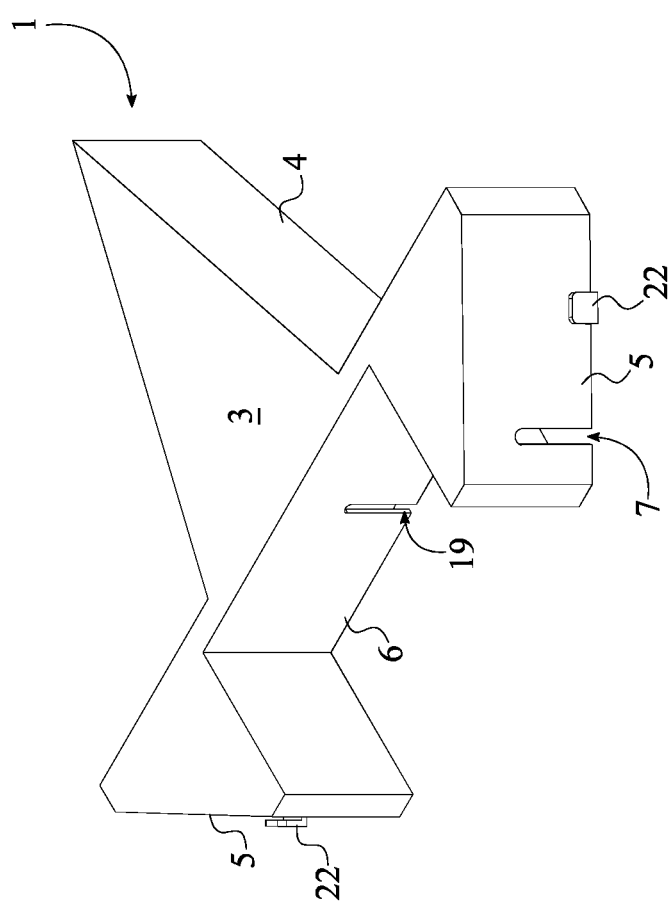
FIG. 6 is a top perspective view of the first frame section of the present invention.
Figure 7:
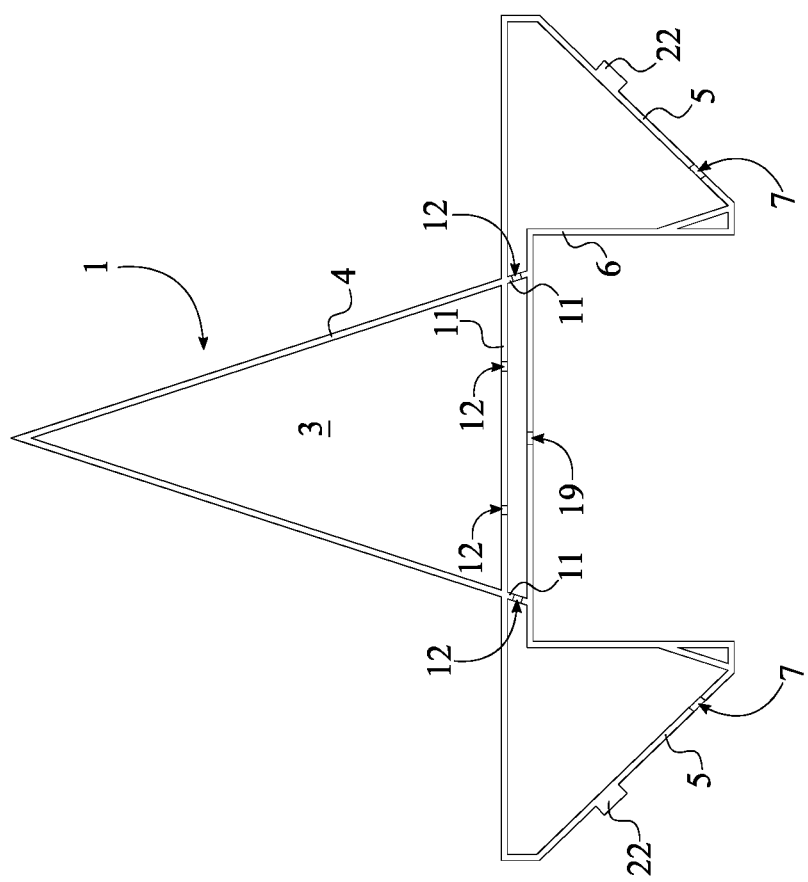
FIG. 7 is a rear view of the first frame section of the present invention.
Figure 9:
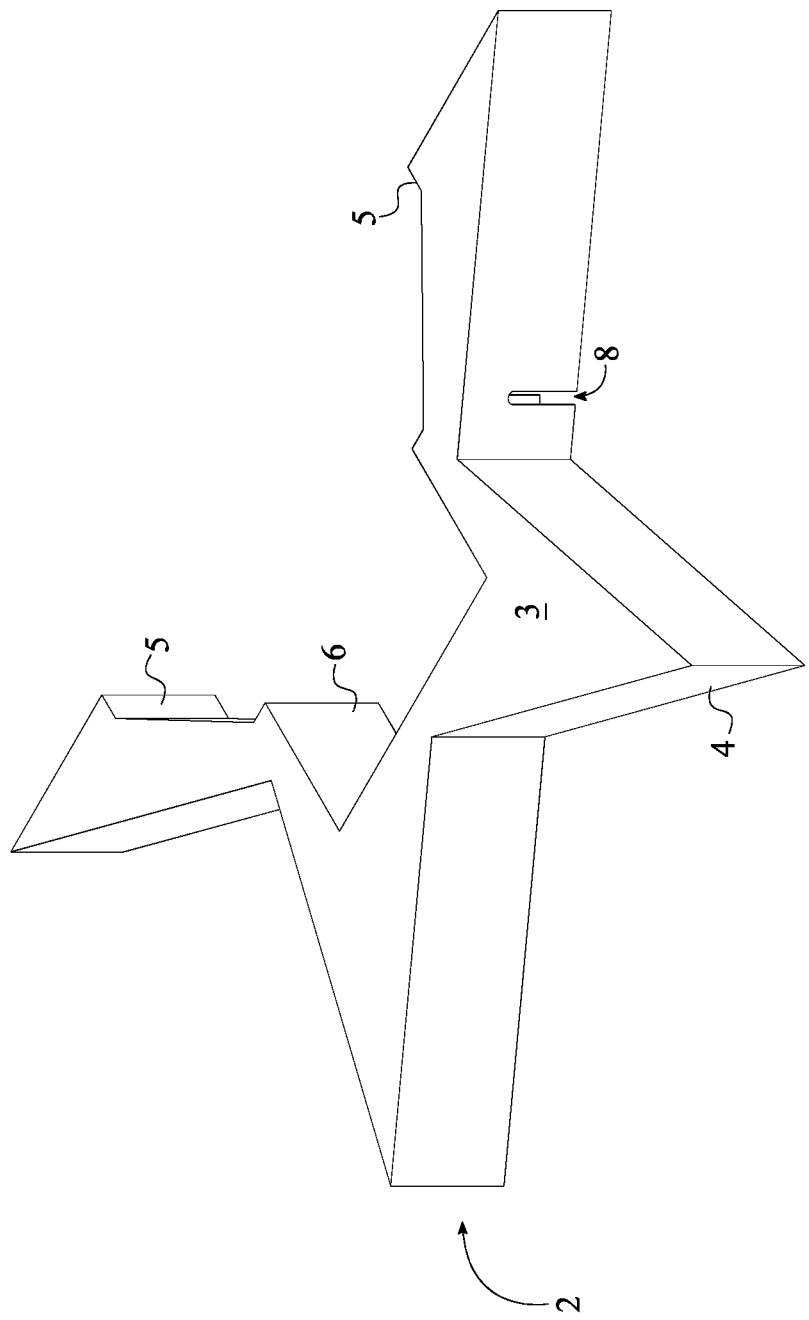
FIG. 9 is a top perspective view of the second frame section of the present invention.
Figure 10:
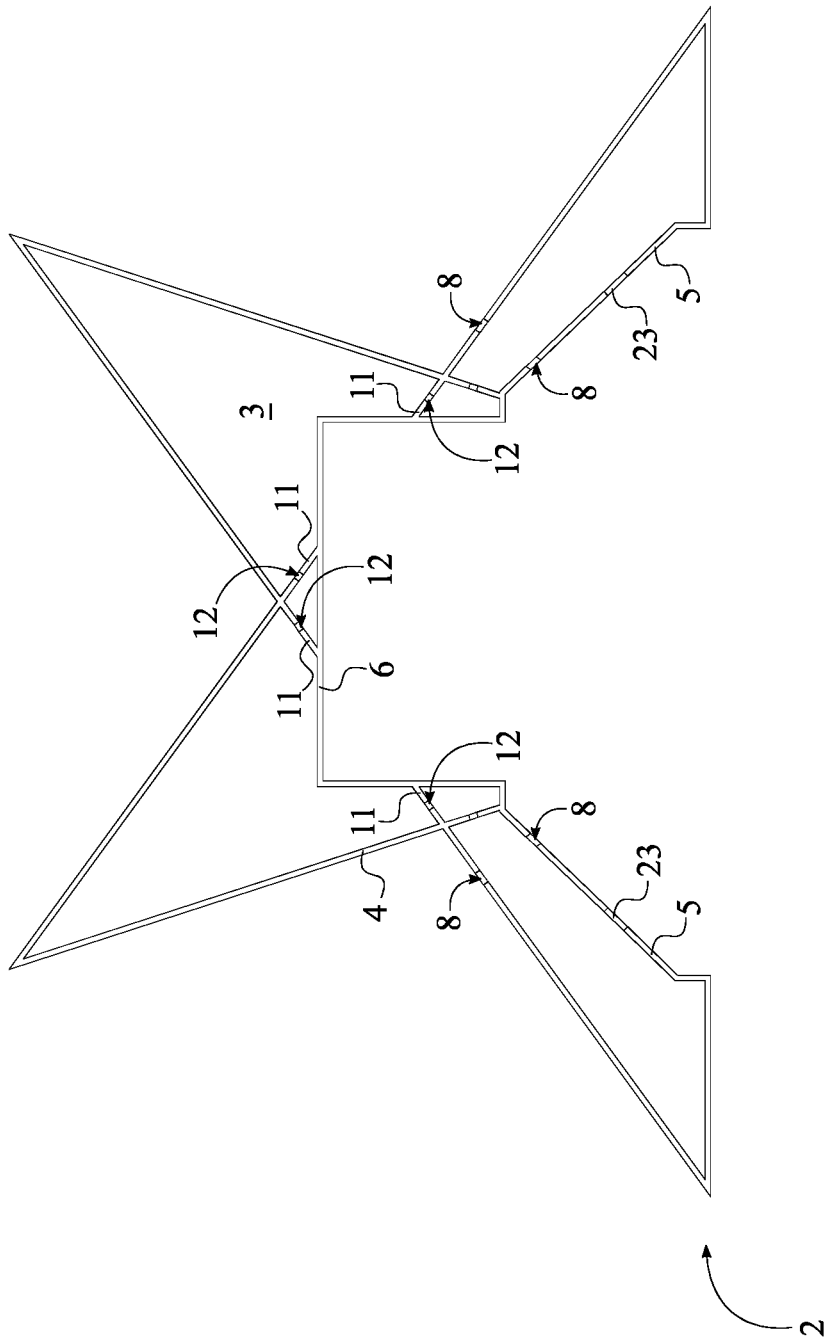
FIG. 10 is a rear view of the second frame section of the present invention.

In reference to FIG. 6-7, the first frame section 1 further comprises a plurality of first placement openings 7 that traverses through the pair of interlocking lateral walls 5 of the first frame section 1. In reference to FIG. 9-10, the second frame section 2 further comprises a plurality of second placement openings 8 that traverses through the pair of interlocking lateral walls 5 and the outer lateral wall 4 of the second frame section 2. Similar to the at least one channel opening 12, the plurality of first placement openings 7 and the plurality of second placement openings 8 are integrated into the respective frame section so that the at least one accessory system 13 can be inserted into the present invention and withdrawn from the present invention.

Figure 12:
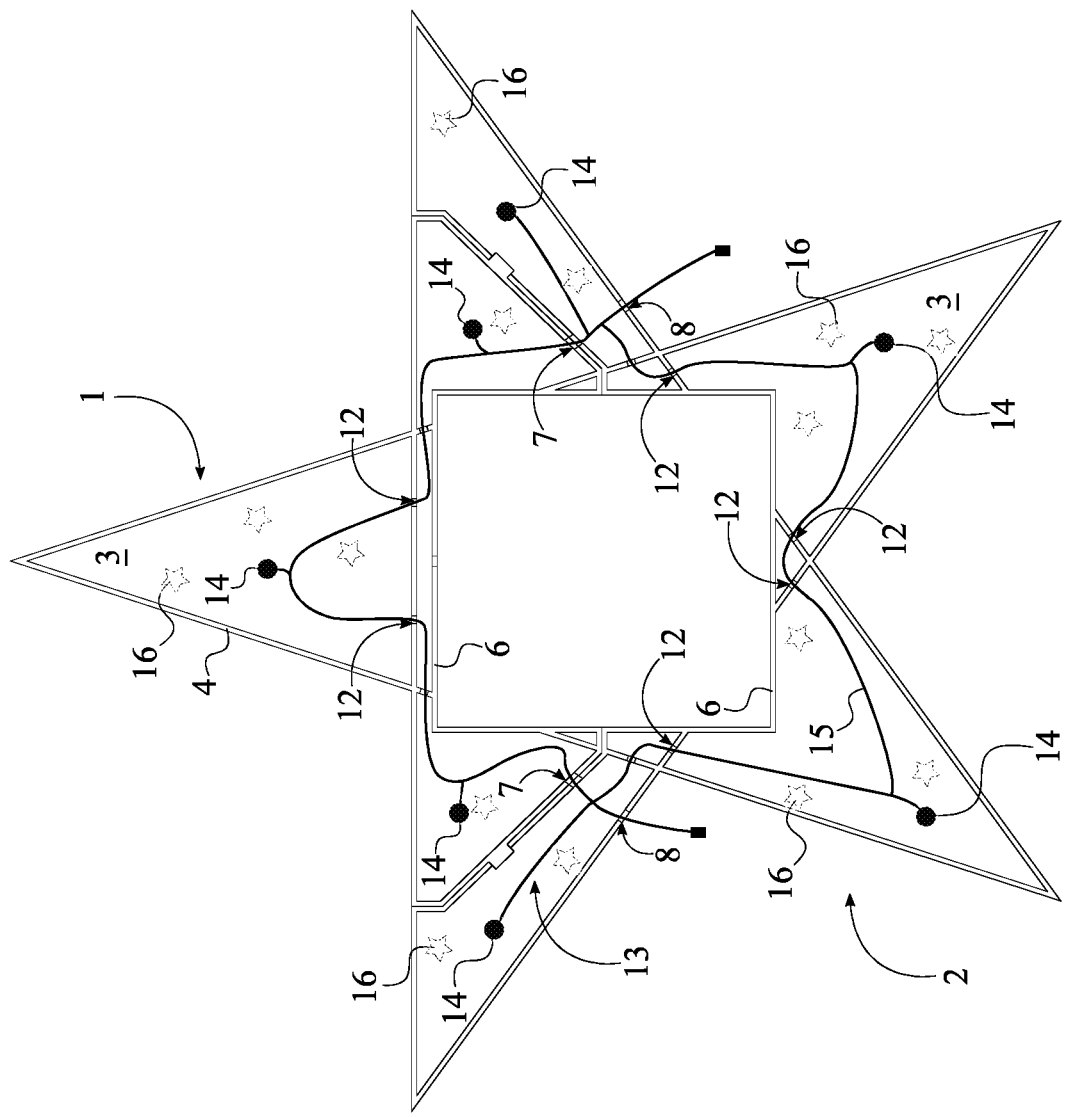
FIG. 12 is a rear view of the present invention, showing the first embodiment for the at least one accessory system.

A first embodiment of the at least one accessory system 13 comprises a plurality of lighting devices 14, a flexible power cord 15, and a plurality of illuminating holes 16 as shown in FIG. 12. More specifically, the plurality of lighting devices 14 is electrically connected to each other by the flexible power cord 15 as the flexible power cord 15 supplies electrical power to the plurality of lighting devices 14 from an external power source. In reference to the placement of the first embodiment of the at least one accessory system 13, the flexible power cord 15 is positioned within the plurality of first placement openings 7, the plurality of second placement openings 8, and the at least one channel opening 12 of the first frame section 1 and the second frame section 2. The plurality of illuminating holes 16 traverses through the cover panel 3 of the first frame section 1 and the second frame section 2. Resultantly, each lighting device 14 is positioned adjacent to each of the plurality of illuminating holes 16 so that the plurality of lighting devices 14 can project beams of light through the plurality of illuminating holes 16 and onto the plant.

Figure 13:
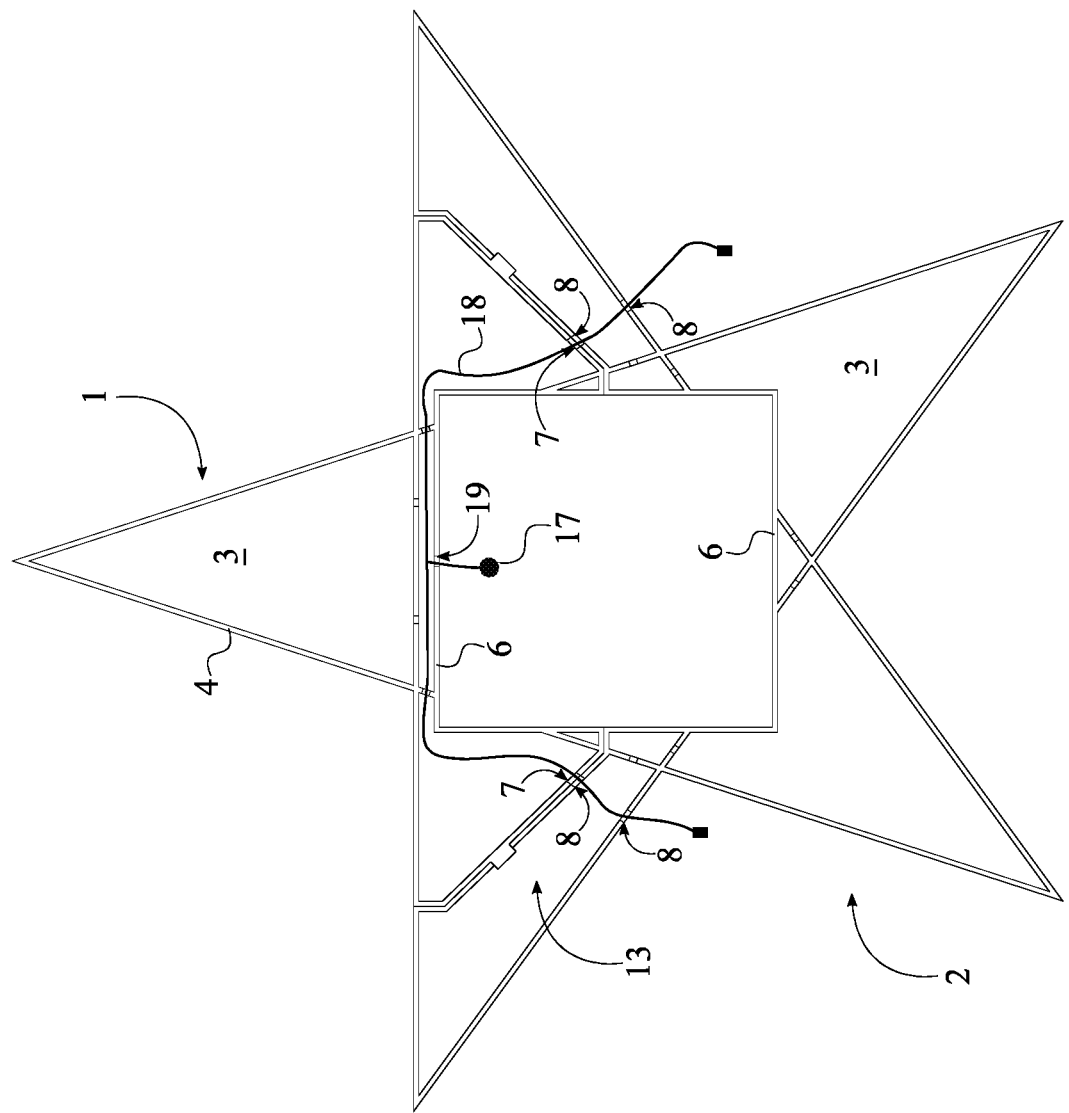
FIG. 13 is a rear view of the present invention, showing the second embodiment for the at least one accessory system.

A second embodiment of the at least one accessory system 13 comprises at least one lighting device 17, a flexible power cable 18, and at least one access opening 19 as shown in FIG. 13. More specifically, the at least one lighting device 17 and the flexible power cable 18 are electrically connected to each other as the flexible power cable 18 supplies electrical power to the at least one lighting device 17 from an external power source. In reference to the placement of the second embodiment of the at least one accessory system 13, the flexible power cable 18 is positioned within the plurality of first placement openings 7 and the plurality of second placement openings 8. The at least one access opening 19 traverses through the inner lateral wall 6 of the first frame section 1. Resultantly, the at least one lighting device 17 traverses through the at least one access opening 19 and positioned within the plant opening 10 so that the at least one lighting device 17 can project a beam of light through the plant opening 10 and onto the plant.

Figure 14:
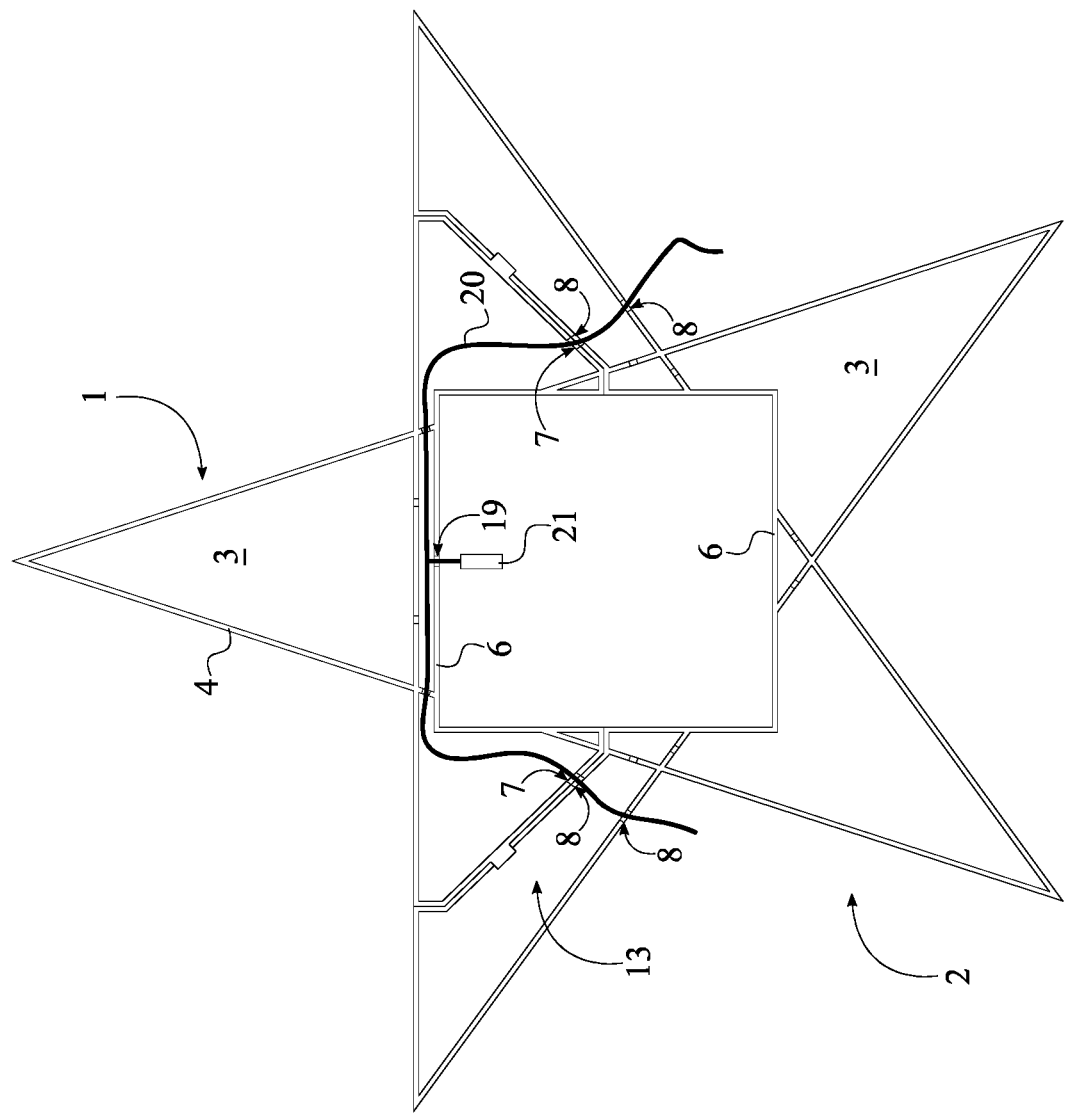
FIG. 14 is a rear view of the present invention, showing the third embodiment for the at least one accessory system.

A third embodiment of the at least one accessory system 13 comprises a flexible tube 20 and a spout 21, in addition to the at least one access opening 19 as shown in FIG. 14. More specifically, the spout 21 and the flexible tube 20 are in fluid communication with each other as the flexible tube 20 supplies a flow of water to the spout 21 from an external water source. In reference to the placement of the third embodiment of the at least one accessory system 13, the flexible tube 20 is positioned within the plurality of first placement openings 7 and the plurality of second placement openings 8. The at least one access opening 19, which traverses through the inner lateral wall 6 of the first frame section 1, provide an opening for the spout 21 to be positioned. Resultantly, the spout 21 is traversed through the at least one access opening 19 and positioned within the plant opening 10 so that the spout 21 can discharge a flow of water to the root system of the plant base.

Although the invention has been explained in relation to its preferred embodiment, it is to be understood that many other possible modifications and variations can be made without departing from the spirit and scope of the invention as hereinafter claimed.

What is claimed is:

1. A plant framing apparatus comprising:
a first frame section;
a second frame section;
a first locking mechanism;
a second locking mechanism;
a plant opening;
at least one accessory system;
the first frame section and the second frame section being attached to each other by the first locking mechanism and the second locking mechanism;
the first frame section and the second frame section each comprising a cover panel, an inner lateral wall, an outer lateral wall and a pair of interlocking lateral walls, the outer lateral wall and the inner lateral wall being terminally connected to each other by the pair of interlocking lateral walls, the outer lateral wall, the pair of interlocking lateral walls and the inner lateral wall being perimetrically connected around the cover panel;
the plant opening being delineated by the inner lateral wall of the first frame section and the inner lateral wall of the second frame section;
the at least one accessory system being integrated into the first frame section and the second frame section;
the at least one accessory system comprising a plurality of lighting devices coupled to a power cord, wherein the plurality of lighting devices project beams of light;
the cover panel, the inner lateral wall, the outer lateral wall and the pair of interlocking lateral walls of the first frame section define a first internal compartment, a part of the plurality of lighting devices being within the first internal compartment; and
the cover panel, the inner lateral wall, the outer lateral wall and the pair of interlocking lateral walls of the second frame section define a second internal compartment, a remaining part of the plurality of lighting devices being within the second internal compartment; and
wherein the plurality of lighting devices are all within at least one of the first internal compartment and the second internal compartment
and wherein further the at least one accessory system comprises a flexible tube, a spout and at least one access opening;
the spout and the flexible tube are in fluid communication with each other;
the flexible tube is positioned within a plurality of first placement openings of the first frame section;
the flexible tube is positioned within a plurality of second placement openings of the second frame section;
the at least one access opening traverses through the inner lateral wall of the first frame section; and
the spout is positioned within the plant opening.

2. The plant framing apparatus as claimed in claim 1,
wherein the outer lateral wall of the first frame section, the pair of interlocking lateral walls of the first frame section and the inner lateral wall of the first frame section are perpendicularly positioned to the cover panel of the first frame section; and
the outer lateral wall of the second frame section, the pair of interlocking lateral walls of the second frame section and the inner lateral wall of the second frame section are perpendicularly positioned to the cover panel of the second frame section.

3. The plant framing apparatus as claimed in claim 1,
wherein the cover panel of the first frame section is angularly extended from the outer lateral wall of the first frame section to the plant opening;
the cover panel of the second frame section is angularly extended from the outer lateral wall of the second frame section to the plant opening;
the cover panel of the first frame section and the inner lateral wall of the first frame section are angularly positioned with each other at a first obtuse angle; and
the cover panel of the second frame section and the inner lateral wall of the second frame section are angularly positioned with each other at a second obtuse angle.

4. The plant framing apparatus as claimed in claim 1,
wherein the plurality of first placement openings traverse through the pair of interlocking lateral walls of the first frame section.

5. The plant framing apparatus as claimed in claim 4,
wherein the plurality of second placement openings traverse through the pair of interlocking lateral walls of the second frame section and the outer lateral wall of the second frame section; and
wherein the plurality of second placement openings traversing through the pair of interlocking lateral walls of the second frame section align with the plurality of first placement openings traversing through the pair of interlocking lateral walls of the first frame section.

6. The plant framing apparatus as claimed in claim 5,
wherein the plurality of lighting devices are electrically connected to each other by the power cord
and the power cord is positioned within the plurality of first placement openings of the first frame section, at least one channel opening of the first frame section, the plurality of second placement openings of the second frame section, and at least one channel opening of the second frame section.

7. The plant framing apparatus as claimed in claim 5,
wherein the at least one accessory system comprises at least one access opening;
the plurality of lighting devices are electrically connected to the power cord;
the power cord is positioned within a plurality of first placement openings of the first frame section;
the power cord is positioned within a plurality of second placement openings of the second frame section;
the at least one access opening traverses through the inner lateral wall of the first frame section;
the at least one lighting device traverses through the at least one access opening; and
the at least one lighting device is positioned within the plant opening.

8. The plant framing apparatus as claimed in claim 1,
wherein the first frame section and the second frame section each comprise a plurality of structural walls;
the plurality of structural walls of the first frame section are internally connected to the outer lateral wall of the first frame section, the pair of interlocking lateral walls of the first frame section, the cover panel of the first frame section and the inner lateral wall of the first frame section; and the plurality of structural walls of the second frame section are internally connected to the outer lateral wall of the second frame section, the pair of interlocking lateral walls of the second frame section, the cover panel of the second frame section and the inner lateral wall of the second frame section.

9. The plant framing apparatus as claimed in claim 8, wherein the first frame section and the second frame section each comprise at least one channel opening;

the at least one channel opening of the first frame section traverses through the plurality of structural walls of the first frame section; and the at least one channel opening of the second frame section traverses through the plurality of structural walls of the second frame section.

10. The plant framing apparatus as claimed in claim 1, wherein each of the first locking mechanism and the second locking mechanism comprise a first interlocking body and a second interlocking body;

the first interlocking body of the first locking mechanism and the first interlocking body of the second locking mechanism are connected to the first frame section;

the first interlocking body of the first locking mechanism is adjacently positioned to one interlocking lateral wall of the pair of interlocking lateral walls of the first frame section;

the second interlocking body of the first locking mechanism is integrated to one interlocking lateral wall of the pair of interlocking lateral walls of the second frame section;

the first interlocking body of the first locking mechanism and the second interlocking body of the first locking mechanism are engaged with each other;

the first interlocking body of the second locking mechanism is adjacently positioned to the other interlocking lateral wall of the pair of interlocking lateral walls of the first frame section;

the second interlocking body of the second locking mechanism is integrated to the other interlocking lateral wall of the pair of interlocking lateral walls of the second frame section; and the first interlocking body of the second locking mechanism and the second interlocking body of the second locking mechanism are engaged with each other.

11. The plant framing apparatus as claimed in claim 1, wherein the at least one accessory system comprises a plurality of illuminating holes;

the plurality of illuminating holes traverses through the cover panel of the first frame section and the cover panel of the second frame section; and a corresponding lighting device of the plurality of lighting devices is positioned adjacent to a corresponding illuminating hole of the plurality of illuminating holes to project the beams of light through the corresponding illuminating hole.

12. A plant framing apparatus comprising:
a first frame section;
a second frame section;
a first locking mechanism;
a second locking mechanism;
a plant opening;
at least one accessory system;

the first frame section and the second frame section being attached to each other by the first locking mechanism and the second locking mechanism;

the first frame section and the second frame section each comprising a cover panel, an inner lateral wall, an outer lateral wall and a pair of interlocking lateral walls, the outer lateral wall and the inner lateral wall being terminally connected to each other by the pair of interlocking lateral walls, the outer lateral wall, the pair of interlocking lateral walls and the inner lateral wall being perimetrically connected around the cover panel;

the plant opening being delineated by the inner lateral wall of the first frame section and the inner lateral wall of the second frame section;

the at least one accessory system being integrated into the first frame section and the second frame section;

the at least one accessory system comprising at least one lighting device coupled to a power cable and at least one access opening, wherein the at least one lighting device projects a beam of light;

the at least one lighting device and the power cable being electrically connected to each other;

the power cable being positioned within a plurality of first placement openings of the first frame section and within a plurality of second placement openings of the second frame section;

the at least one access opening traversing through the inner lateral wall of the first frame section;

the at least one lighting device traversing through the at least one access opening; and the at least one lighting device being positioned within the plant opening and projecting a beam of light within the plant opening;

wherein said plurality of first placement openings traverse through the pair of interlocking lateral walls of the first frame section and align with a portion of the plurality of second placement openings, said portion of the plurality of second placement openings traversing through the pair of interlocking lateral walls of the second frame section.

13. A plant framing apparatus comprising:
a) a first frame section and a second frame section, each having an inner lateral wall; and
b) at least one accessory system comprising:
   i. a flexible tube,
   ii. a spout and
   iii. at least one access opening;

wherein the first frame section and the second frame section interlock by way of a pair of interlocking lateral walls such that the inner lateral walls form a plant opening;

wherein the flexible tube is positioned within a plurality of placement openings that traverse through the pair of interlocking lateral walls;

the at least one access opening traversing through the inner lateral wall of the first frame section;

the spout being positioned within the plant opening; and wherein the spout and the flexible tube are in fluid communication with each other and are configured such that the spout is effective to deliver a flow of water to a root system of a plant within the plant opening.

14. The plant framing apparatus of claim 13, wherein the plant framing apparatus further comprises a first cover panel for the first frame section and a second cover for the second frame section, and wherein the first cover panel and the second cover panel are connected to the pair of interlocking lateral walls and are sloped inward and downward from an outer edge of the plant framing apparatus to the plant opening.

* * * * *